United States Patent
Kramer (10) Patent No.: US 10,894,466 B2
(45) Date of Patent: Jan. 19, 2021

(54) ARRANGEMENT FOR PROVIDING INCREASED ACCESS TO AN ENCLOSED PICKUP TRUCK CARGO BED

(71) Applicant: Jerry Kramer, Atlanta, GA (US)

(72) Inventor: Jerry Kramer, Atlanta, GA (US)

( * ) Notice: Subject to any disclaimer, the term of this patent is extended or adjusted under 35 U.S.C. 154(b) by 174 days.

(21) Appl. No.: 16/163,963

(22) Filed: Oct. 18, 2018

(65) Prior Publication Data

US 2019/0118628 A1     Apr. 25, 2019

Related U.S. Application Data

(60) Provisional application No. 62/627,834, filed on Feb. 8, 2018, provisional application No. 62/574,311, filed on Oct. 19, 2017.

(51) Int. Cl.
| | |
|---|---|
| *B60J 7/14* | (2006.01) |
| *B60J 7/00* | (2006.01) |
| *B60J 7/02* | (2006.01) |
| *B60J 7/10* | (2006.01) |

(52) U.S. Cl.
CPC ............ *B60J 7/141* (2013.01); *B60J 7/0061* (2013.01); *B60J 7/026* (2013.01); *B60J 7/106* (2013.01)

(58) Field of Classification Search
CPC .. B60J 7/141; B60J 7/026; B60R 9/06; B60R 9/065; B62D 33/04; B62D 33/046
USPC .. 296/10, 181.2, 181.3, 181.7, 182.1, 185.1, 296/186.2, 186.5, 100.03; 224/320, 403; 211/195
See application file for complete search history.

(56) References Cited

U.S. PATENT DOCUMENTS

| | | | | | |
|---|---|---|---|---|---|
| 2,610,366 | A | * | 9/1952 | McKee | ..................... E06B 3/01 49/40 |
| 2,664,597 | A | * | 1/1954 | McKee | ..................... E06B 3/01 49/40 |
| 2,728,115 | A | * | 12/1955 | Cornelius | ............. E04B 1/3448 52/67 |
| 3,009,212 | A | * | 11/1961 | Makens | ................. B62D 33/08 52/66 |
| 3,175,857 | A | * | 3/1965 | Lewis | ..................... B60P 3/341 296/164 |
| 3,394,961 | A | * | 7/1968 | Matte | ........................ B60P 3/34 296/169 |
| 3,662,410 | A | * | 5/1972 | Lankheet | .................. E04H 3/16 4/498 |
| 3,996,704 | A | * | 12/1976 | Huey | ..................... E04H 6/005 52/64 |
| 4,014,133 | A | * | 3/1977 | Brown | ..................... A01G 9/14 52/66 |

(Continued)

*Primary Examiner* — Hilary L Gutman (74) *Attorney, Agent, or Firm* — John R Benefiel (57) ABSTRACT

A pickup truck cap having bendable plastic side panels having a bottom side located along a respective riser installed on each pickup truck cargo bed side wall. The side panels are each engaged by a curved respective guide located adjacent each end of each side panel to conform each side panel to curvature of an associated guide. An upper side of each side panel is received beneath a rectangular top assembly included in the cap. Either of side panels are movable upwardly to raise the bottom side thereof up from a respective riser to create an access opening beneath a raised side panel along each side of the cap. A pair of movable side panels can also be arranged to close off access through a cover installed on the cargo bed of a pickup truck.

11 Claims, 8 Drawing Sheets

(56) References Cited

U.S. PATENT DOCUMENTS

| | | | | | |
|---|---|---|---|---|---|
| 4,294,484 | A | * | 10/1981 | Robertson | B60P 3/34 135/88.13 |
| 4,783,861 | A | * | 11/1988 | Leurent | A01G 9/1469 4/498 |
| 5,339,852 | A | * | 8/1994 | Bull | A01M 31/025 135/124 |
| 5,778,603 | A | * | 7/1998 | Reppas | E04B 7/166 52/6 |
| 6,360,492 | B1 | * | 3/2002 | Ross | E04H 6/44 135/124 |
| 6,505,879 | B1 | * | 1/2003 | Arviso | B60J 7/102 296/100.18 |
| 7,946,457 | B2 | * | 5/2011 | Kramer | B60R 9/00 224/316 |
| 8,087,716 | B2 | * | 1/2012 | Kramer | B60J 7/026 296/185.1 |
| 8,322,779 | B2 | * | 12/2012 | Kramer | B60J 7/026 296/185.1 |
| 9,156,391 | B2 | * | 10/2015 | Loranger | B60P 3/341 |
| 9,920,547 | B1 | * | 3/2018 | Greenblatt | E04H 6/005 |
| 9,926,026 | B2 | * | 3/2018 | Vandergon | B60P 3/341 |
| 10,605,407 | B2 | * | 3/2020 | Muth | F16P 3/02 |

\* cited by examiner

ARRANGEMENT FOR PROVIDING INCREASED ACCESS TO AN ENCLOSED PICKUP TRUCK CARGO BED

CROSS REFERENCE TO RELATED APPLICATIONS

This application claims the benefit of provisional application No. 62/574,311 filed on Oct. 19, 2017, and provisional application No. 62/627,834 filed on Feb. 8, 2018.

BACKGROUND OF THE INVENTION

This application concerns enclosed pickup truck cargo beds.

It has been a common practice to install a cap over the cargo bed of pickups (see prior U.S. Pat. Nos. 8,087,716; 8,322,779 and 7,946,457 issued to the inventor of the present patent application, in order to protect items loaded into the cargo bed. Covers are also well known.

A cover extends across the cargo bed at the level of the top of the truck cargo bed sidewalls, while a cap has a top which is elevated well above the bed sidewalls, with a door typically included to allow entry into the space within the cap.

The present inventor has previously invented an arrangement for readily converting a cap to a cover and vice versa, wherein the cap and cover are formed with the use of plastic panels mounted in a metal framework, see U.S. Pat. Nos. 8,087,716 and 8,322,779.

Such construction allows compact shipping of the cap components since ef the flat panels can be stacked for shipping.

One problem with such caps or covers is that the access to the interior of the cargo space is limited once a cap or cover is installed.

It would be advantageous if a person could be able to reach into the cargo space from locations alongside the cargo bed rather than having to climb into the cargo space as through the door usually provided at the rear end of a cap.

It is an object of the present invention to provide an arrangement which allows convenient access into an enclosed cargo bed by a person standing anywhere alongside the truck cargo bed.

A problem with the use of plastic panels in constructing such coverings has been the considerable variations in the lengths of cargo beds between the various pickup truck models. As described in the above cited patents, adjustable length frame members comprised of members with overlapped ends may be used to be fit a cap to different lengths of truck cargo beds, and long length panels are provided which are cut to be fit into openings defined within the frame after the frame members are adjusted to fit a particular truck model. The need to cut the panels to size has been found to be a significant drawback for many purchasers.

It is another object of the present invention to more conveniently provide an ability to match lengthwise dimension of the panels included in a cap installed on a pickup truck cargo bed to the varying lengths of pickup truck cargo beds.

SUMMARY OF THE INVENTION

The above recited objects and other objects which will be understood by those skilled in the art are achieved by a cap which includes a pair of bendable plastic side panels, preferably made of polycarbonate plastic, each side panel installed in an opening defined in a cap framework extending along each side of the cap. The plastic panels normally extend up from a respective one of a pair of elongated risers, each mounted atop one of the side walls of the truck cargo bed. Either end of each side panel is engaged by a respective one of four fixed guides. Each guide has a curved surface arranged to engage one end of a flexible side panel at a middle portion thereof to conform the side panel to the curvature of the guides. By conforming a greater middle portion of the side panels into a curved shape matched to each guide surface, this causes the straight upper portion of each side panel to extend generally horizontally from the curved middle portion.

The horizontal upper portion of each of the side panels normally extends a short distance into a space beneath a top assembly included in the cap. The side panels thus normally extend completely across the space between the top assembly and the risers to thereby normally block access to the interior of the cap through either side of the cap and thus provide security to the contents of the cargo bed.

According to the present invention, each of the side panel is mounted to allow the panels be manually moved upwardly (upon release of any security lock or latch) so that the lower side of each of the side panels moves up and away from an associated one of the risers to create an access opening extending along each side of the cap located above the riser. Each of the middle and upper portions of the side panels in being moved up becomes overlapped with each other. Each panel is preferably supported on respective one of a pair of support bars located beneath the side panels and each side of the top assembly to thereby securely support the upper and middle portion of each side panel and the weight of any snow accumulations thereon.

The bottom side of each side panel can be moved up a distance sufficient to pass out of engagement with the guides. The bottom of each side panel may then be extended out over the guides after the cap has been converted to a cover.

The side panels with the top assembly normally extend completely over the cargo bed to prevent access thereto, but also allow convenient access to the cargo bed by moving either of the side panels back under the top assembly.

The side panels are preferably formed of fastened together overlapping subpanels, the degree of overlap able to be adjusted so that the combined length of the subpanels may be fit to the length of the truck bed, the subpanels then fastened together, preferably by means of an elongated members such as aluminum angles attached thereto which connect together the subpanels in a given length adjusted state.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
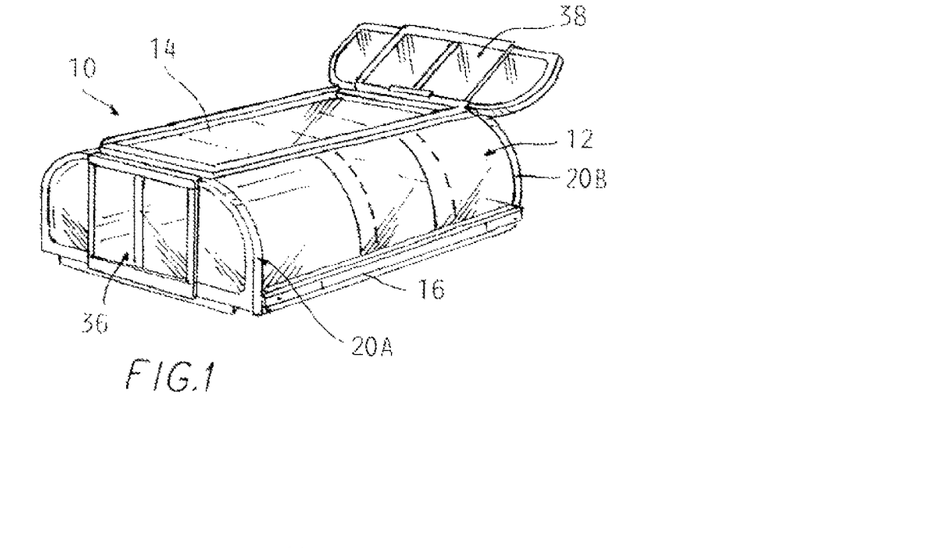
FIG. 1 is a perspective view of a pickup truck cap with an increased cargo access arrangement according to the present invention shown, with a rear door swung up to be opened.
Figure 2:
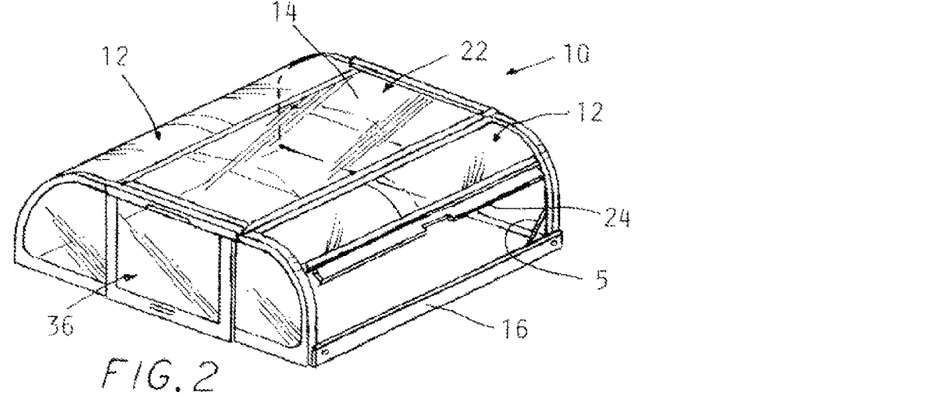
FIG. 2 is a perspective view of the cap shown in FIG. 1 with one of the side panels of the cap shown in FIG. 1 raised to enable access through one side of the cap.
Figure 18:
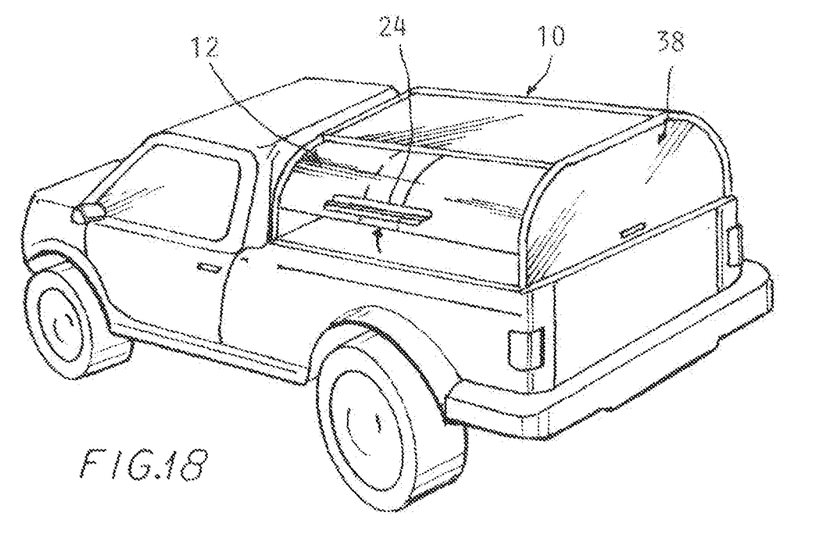
FIG. 18 is a perspective view of a pickup truck with a cap according to the present invention installed with one side panel partially raised to enable access to the cargo space.
Figure 19:
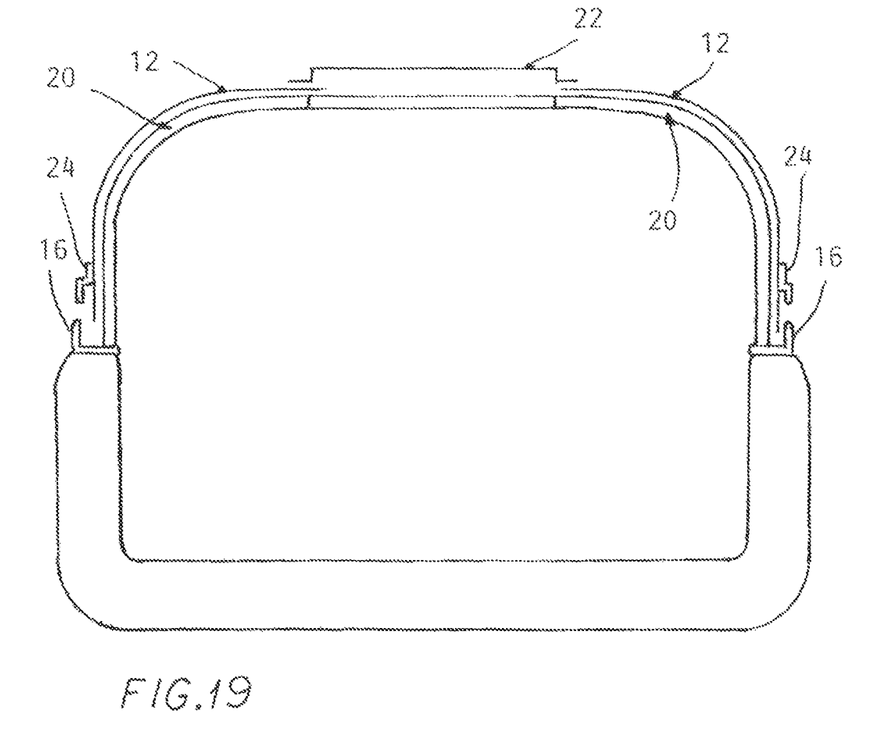
FIG. 19 is a diagrammatic end view of the cargo bed of a pickup truck having risers.

Referring to FIGS. 1 and 2 of the drawings, a cap 10 having an arrangement for providing an increased access according to the invention is shown, adapted to be mounted to a pickup truck to enclose a cargo bed thereof (see FIGS. 18 and 19).

Caps are well known in the art and the present invention includes a cap having an arrangement which provides increased access to the enclosed cargo space for a person outside the truck standing along either side of the cargo bed.

Also, according to another feature of the invention, the cap 10 may be constructed of a framework and a series of adjustable length plastic side panels 12 and a top panel 14 each created by partially overlapped subpanels to be able to be fit to a pickup truck cargo beds of various lengths in a manner that is superior to the prior practice of cutting long panels to size.

Figure 3:
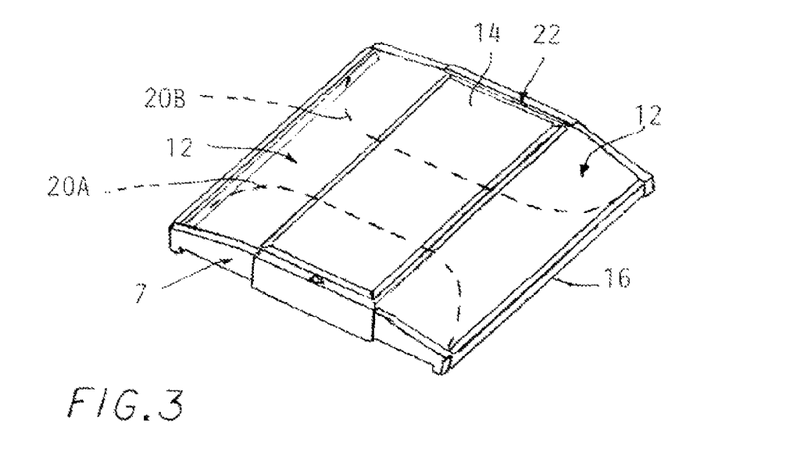
FIG. 3 is a perspective view of the cap shown in FIGS. 1 and 2 collapsed so as to be converted to a cover which also includes an increased access arrangement according to the invention.

While the cap 10 shown can be converted to a cover not necessitating disassembly of the cap (as shown in FIG. 3), the present invention can be used with a cap which cannot be converted to a cover, and some details relating to a convertible cap and also other well known details such as seals, braces 5, fascias 7 covering gaps between the truck and cap, etc. are not described herein as being known to those skilled in the art.

However, the invention can also be used with covers as described below.

As noted, the cap 10 is constructed of a framework composed of various elongated members, preferably made of aluminum, fixed together and in which bendable plastic panels are installed in openings defined by the framework. The plastic panels 12 are of a thickness which is sufficient to effectively deter access but are able to be deflected to be curved as will be described hereinafter.

Polycarbonate panels of 0.08" thickness have been used successfully in the practice of the invention and may be transparent, tinted or opaque. As noted above, the cap includes a pair of side panels 12 and a top assembly panel 14 (FIGS. 1 and 2). Panels for a door 38 and window 36 usually included at opposite ends of the cap 10 may also be made of the same plastic panels.

The side panels 12 while in a relaxed state lie flat but have their respective ends engaged with one of four guides 18 each attached to hoops 20, specifically to a side of two hoops 20A, 20B. Each guide 18 has a curved inner surface 18A (FIG. 8B) which engages a respective end of an associated side panel to conform an intermediate portion 12B of each side panel 12 to normally be held in a curved shape, see FIGS. 8A, 8B.

In order to reduce friction to reduce the effort required, the contacting surfaces of the side panels 12 and 18A of the guide covered with low-friction UHMV tape which is commercially available from 3M, McMaster Carr, and other companies thereby also reducing wear.

Another manner of reducing friction is to provide a series of small rollers arranged along a curved path engaged with said side panel ends.

The side panels 12 each have a bottom side 12A positioned next to a respective one of an elongated pair of risers 16 which are comprised of angles which are each attached to a respective one of a truck cargo bed side, as by being clamped thereto or in any other known way. The bottom side 12A of each side panel 12 when installed extends upwardly a short distance from an associated riser 16. An intermediate portion 12B of each end of the side panels 12 extend into engagement with the curved surface 18A of a respective one of four guides 18 affixed to opposite sides of hoop members 20A, 20B (FIGS. 8A, B), causing the middle 12B of the side panels 12 to normally each be held in conformity to the curved surface 18A of a respective guide 18 (FIGS. 8A, B) this causes an upper portion 12C of the side panels 12 to be oriented generally horizontally, parallel to and located partially beneath the top assembly 22 holding the top panel 14.

Figure 5:
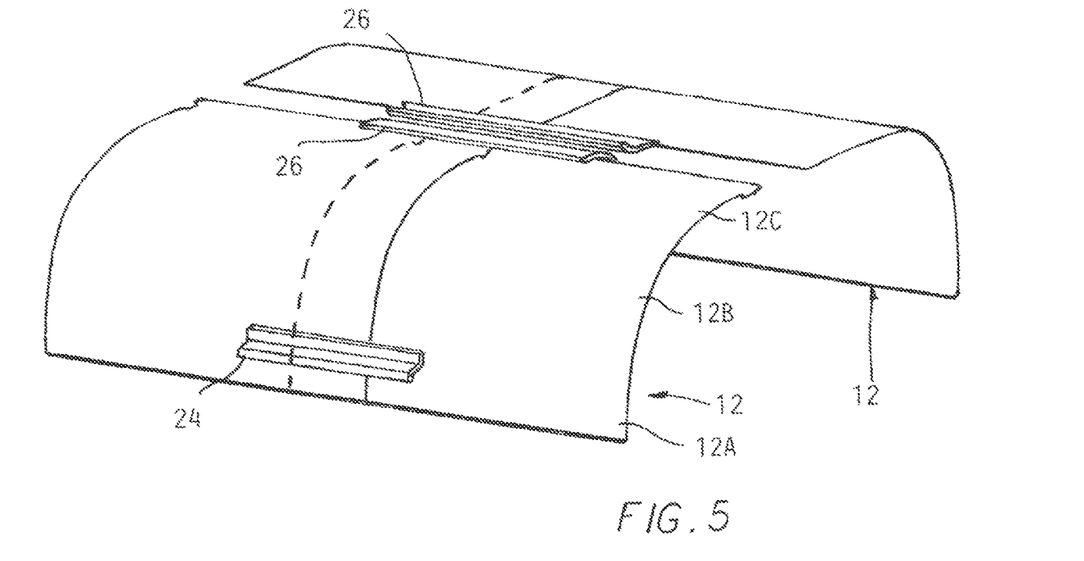
FIG. 5 is a simplified perspective view of a combined subpanel version of the two side panels included in the cap shown in FIGS. 1 and 2.
Figure 6:
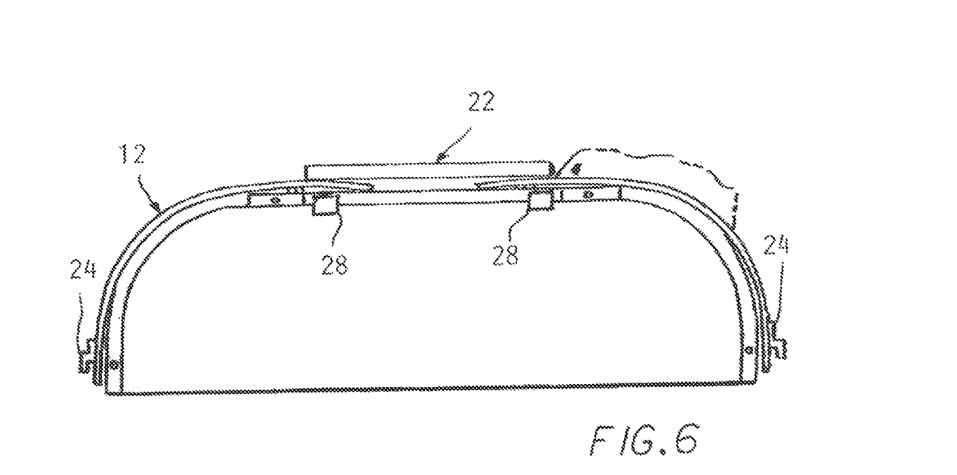
FIG. 6 is a simplified end view of major components of the cap shown in FIG. 1 with support bars holding the upper portions of the side panels to withstand the weight of a snow load on the side panels.
Figure 7:
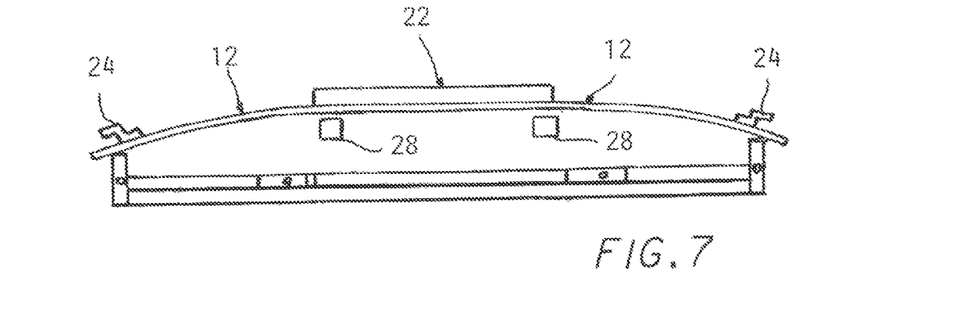
FIG. 7 is an end view of the cap as shown in FIG. 6 in a collapsed state to be converted to a cover.

This arrangement allows the upper portion 12C of each of the side panels 12 which extend generally horizontally to normally extend a short distance beneath the top assembly 22 with the side panels 12 in their normal covering position (FIG. 6). Access to the interior of the cap 10 is thereby blocked by the presence of the side panels 12 in that normal position (FIG. 1). A security lock or latch (not shown) may be provided connecting the side panels 12 to the adjacent According to the present invention, the side panels 12 are able to be manually moved up as by gripping an attached angle 24 which are positioned just above the adjacent riser 16 as handles (FIG. 5).

Either of the side panels 12 may then be moved up and advance the upper portion to extend further beneath the top assembly 22 (FIGS. 9 and 9A) to an extent where one of the side panels 12 may become mostly overlapped with each other to thereby create a lengthwise access opening below the bottom side 12A of one of the side panels as seen in FIGS. 2 and 18.

Figures 8, 9:
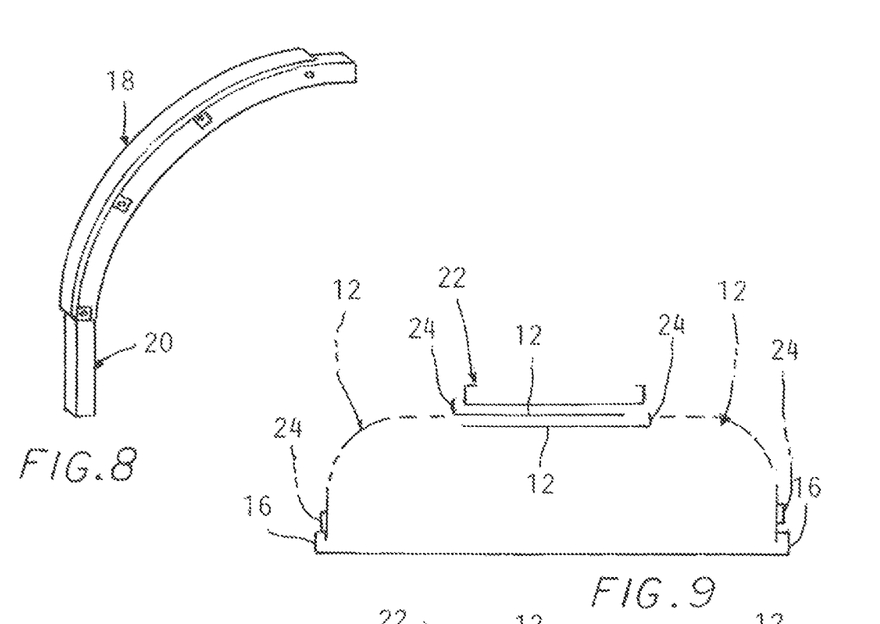
FIG. 8 is a perspective view of one of the side panel end guides attached to a hoop, only a fragmentary portion of the hoop shown.
FIG. 9 is a diagrammatic end view of major components of the cap shown in FIG. 1 depicting the side panels moved up to the open position with broken lines depicting the side panels in the lowered closed position.
Figure 8A:
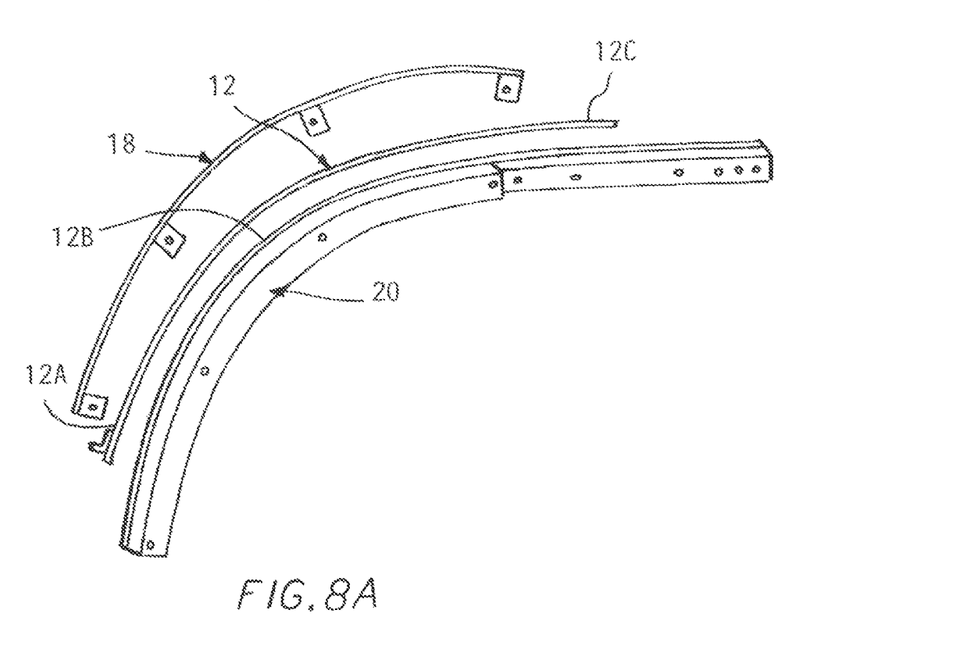
FIG. 8A is an exploded end view of a side panel guide, side panel and a fragmentary portion of a hoop.
Figure 8B:
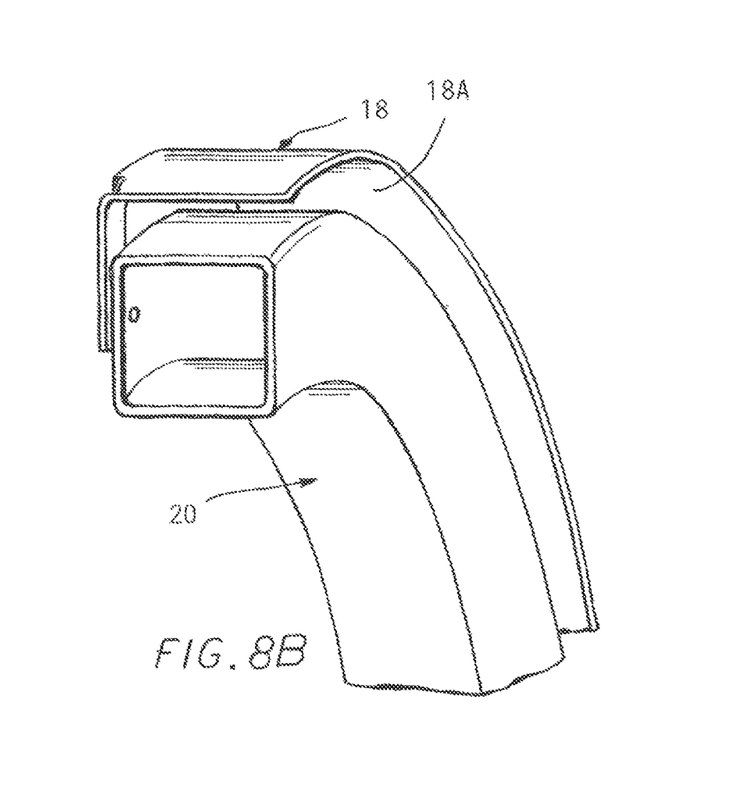
FIG. 8B is an enlarged perspective fragmentary view of a guide installed in a hoop.
Figure 10:
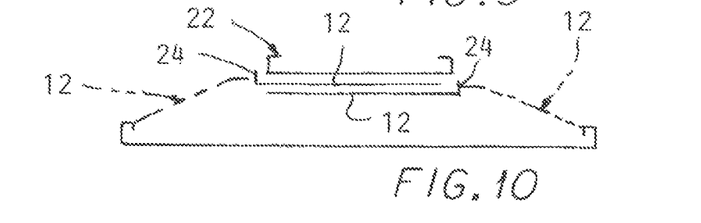
FIG. 10 is a diagrammatic end view of the side panels as shown in FIG. 9 but with the cap in a cover configuration.

Elongate stiffener pieces 26 are also provided attached to the leading ends of the upper portion 12C of each side panel 12 which are preferably shaped to insure reliable passing of the leading edges of upper portion 12C of the side panels 12 past each other to a position mostly overlapping with each other as shown in FIG. 9 when both of the side panels 12 are fully raised.

A pair of support bars 28 (FIGS. 6 and 14) are also provided extending lengthwise beneath the upper portion 12C of the side panels 12 and also beneath the top assembly 22 for support of the side panels 12, so as to be better able to resist the weight of a heavy snow accumulation on the side panels 12 as shown in FIG. 6.

Figure 14:
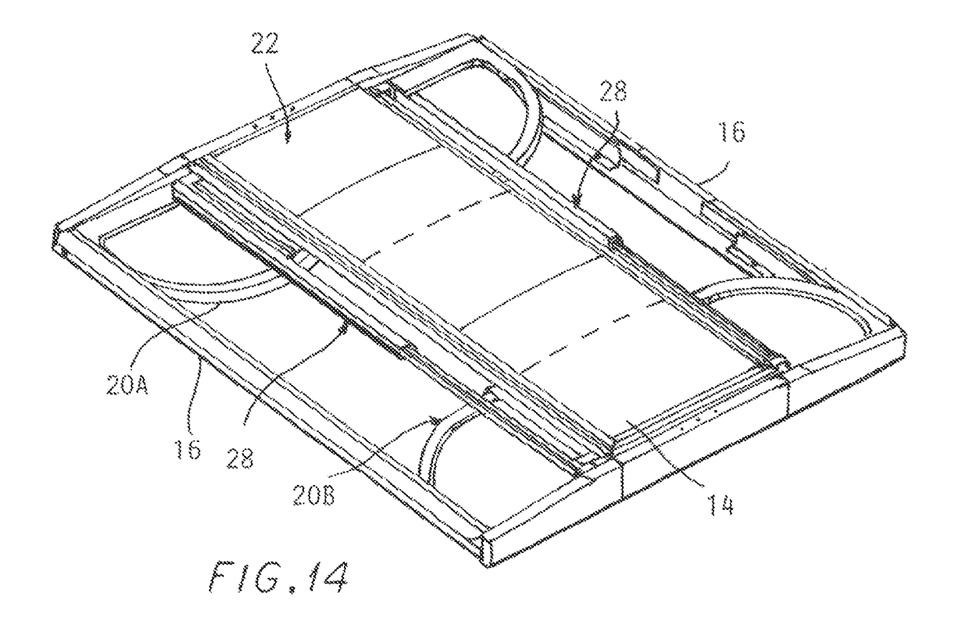
FIG. 14 is a perspective view from the top of a cap framework converted to a cover configuration.
Figure 15:
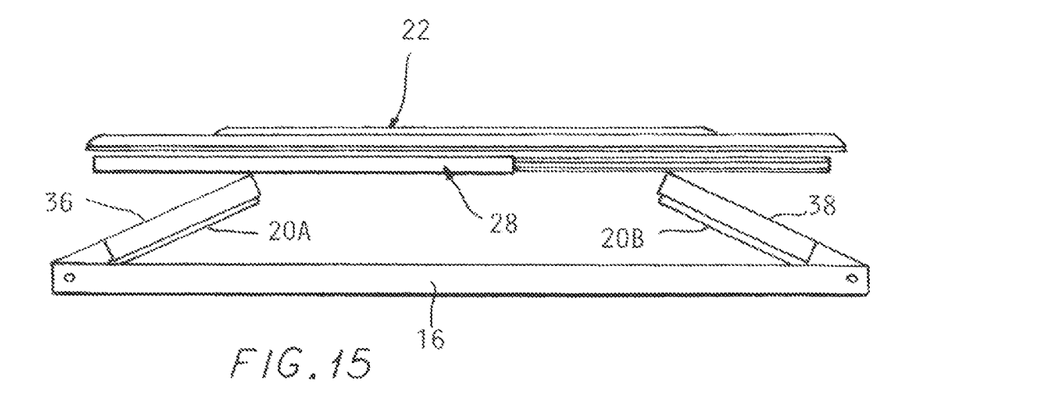
FIG. 15 is a side view of a cap framework with hoops included in the framework shown in FIG. 14 being lowered to be converted to a cover.

The support bars 28 preferably have slightly convex cross pieces 28A attached providing further support for the top pane 14.

The support bars 28 may be attached at either end to either the frame 30 of the top assembly 22 or to the hoop members 20A, 20B.

If the support bars 28 are attached to the top assembly frame 30, it is necessary that the manner of attachment accommodates the end of side panels 12 which as shown extend past the ends of the support bars 28.

Figures 13, 16:
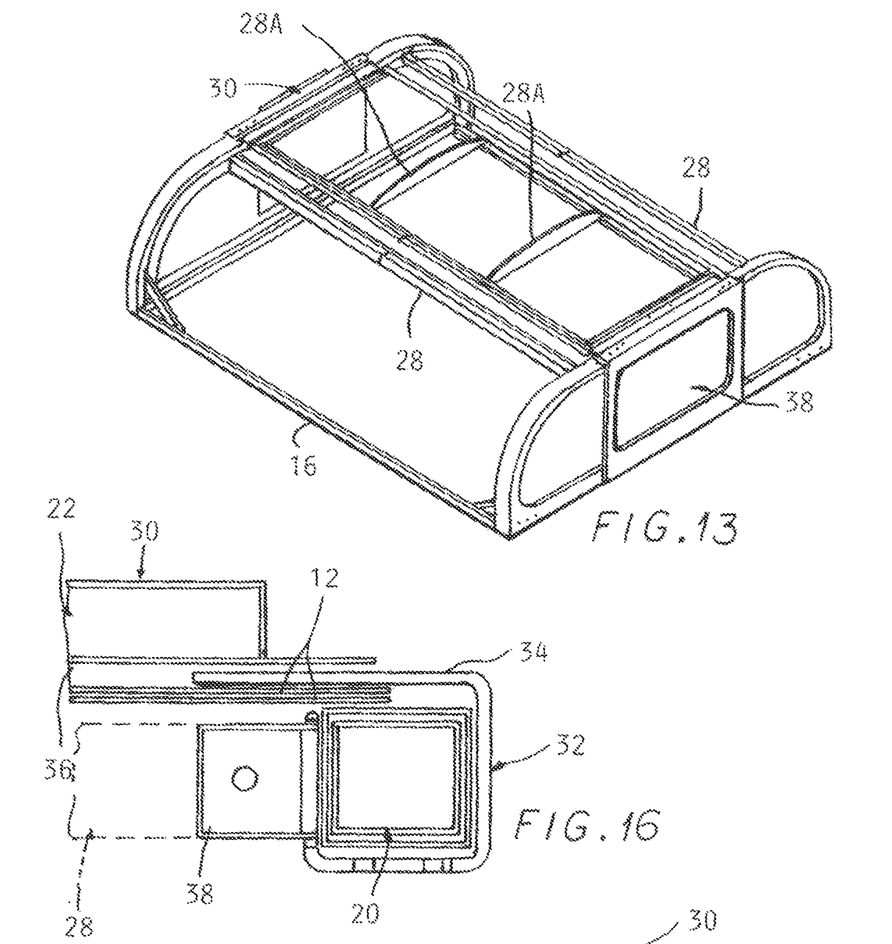
FIG. 13 is a perspective view of major components of the cap framework.
FIG. 16 is a fragmentary end view of a hoop connector connected to a top assembly and one end of a support bar with overlapped side panels disposed beneath the top assembly.

One such attachment is shown in FIG. 16, a hoop connector 32 received in each side of a hoop 20 includes an upper extension 34 extending towards the top assembly 22 with a clearance space 36 accommodating two overlapped side panels 12 which are wider than the length of the support bars 28.

Figure 17:
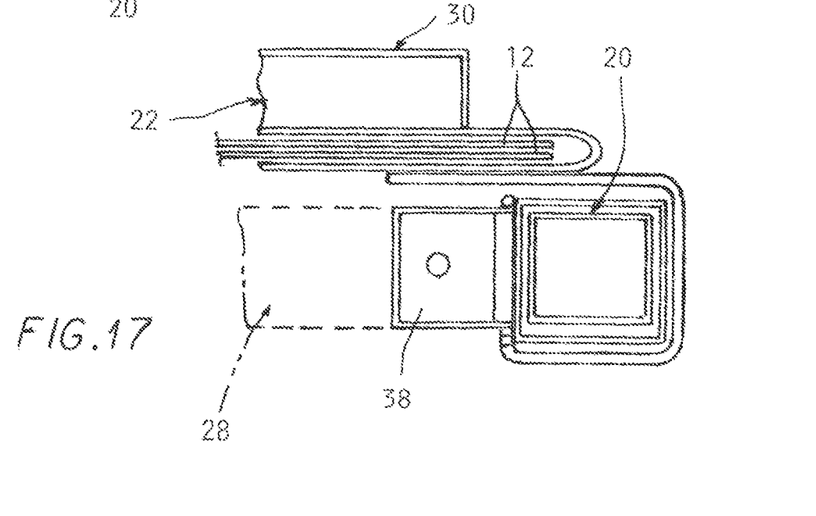
FIG. 17 is a fragmentary end view showing a top assembly member having a portion receiving overlapped side panels and connected to a hoop by a hoop connector also connecting one end of a support bar to a hoop.

Referring to FIG. 17, the top assembly frame 30 can itself include an extension portion 38 extending out past the outer ends of the support bars 28 to also accommodate the wider side panels 12.

The hoop upper extension 38 underlies the top assembly frame 30 to the hoop 20 as shown.

It should be noted that each of the various frame members, including the support bars 28, hoops 20, risers 16, etc., may be made up of a plurality of sub portions assembled together and allowing a lengthwise sliding connection therebetween to enable length adjustments to match the length of the side and top panels 12, 14, and thereby to a particular truck model as described in the patents cited above.

The top assembly frame 30 is comprised of two hoop connectors 32 and an upper extension 34 at either end overlying the top of an adjacent hoop 20A, 20B.

Figure 11:
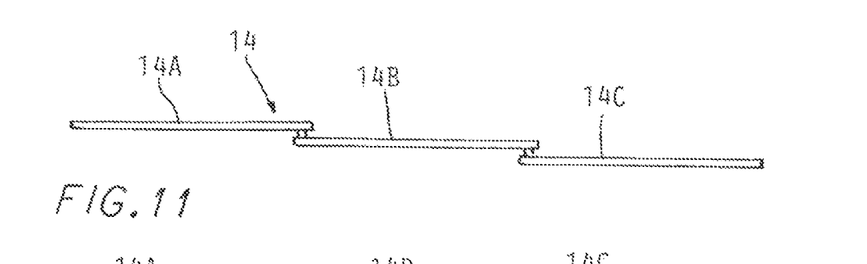
FIG. 11 is a simplified end view of a three subpanel version of one of the side panels for use with long bed pickups.
Figure 12:
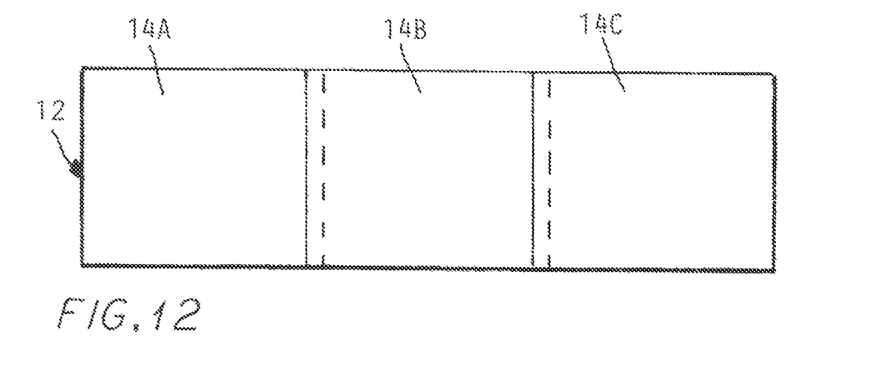
FIG. 12 is a view from the front of the side three subpanel version shown in FIG. 10.

The top panel 14 can be constructed of two or even three subpanels 14A, 14B, 14C (FIGS. 11 and 12) for long bed truck models fit within the top assembly frame 30 which is itself adjustable in length due to overlapping segments of frame members 32. The top panels 14 are usually comprised of two subpanels (possibly three for long bed truck models) whose degree of overlap may be adjusted to obtain a particular overall length as mentioned above.

Figure 4:
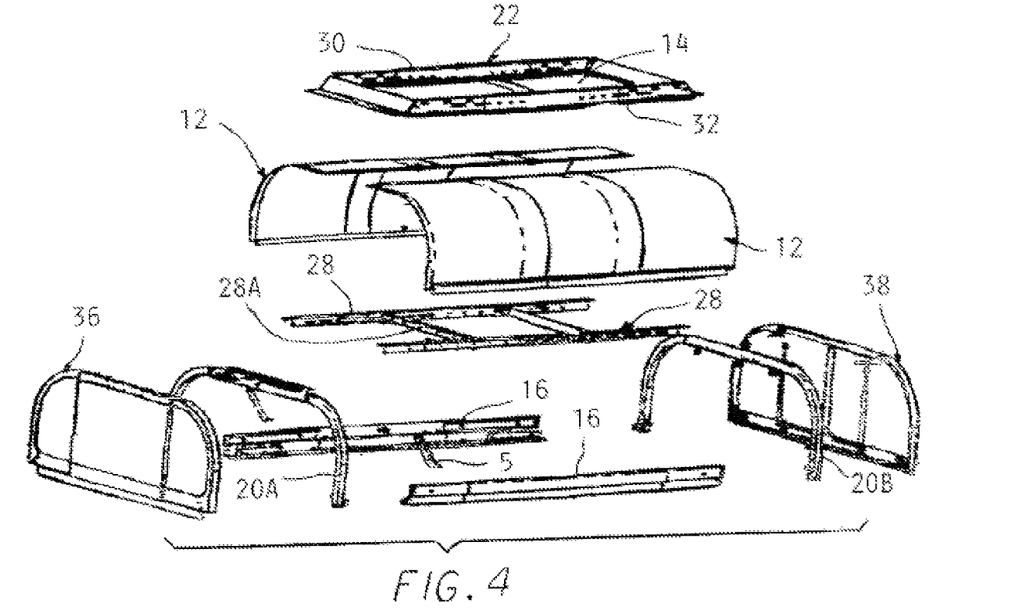
FIG. 4 is an exploded perspective view of major components of the cap shown in FIG. 1.
Figure 4A:
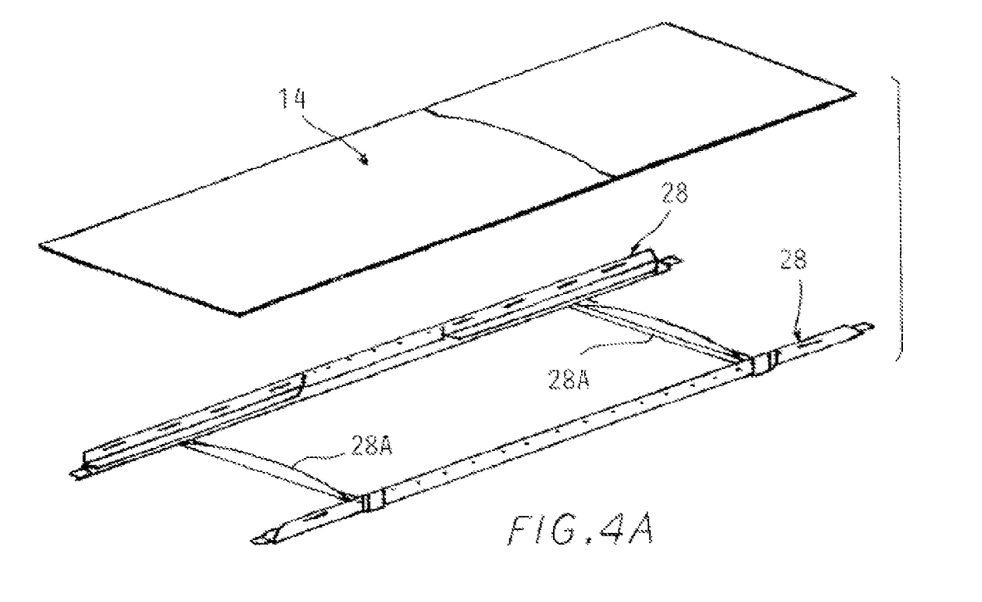
FIG. 4A is an exploded perspective view of support bars and top panel components of the cap shown in FIG. 1.

The front hoop 20A has the front window 36 attached thereto (FIG. 4) and the rear hoop 20B has the door 38 attached thereto in the known manner, with sealing fascias (not shown) mounted to the door covering gaps when in the cover configuration.

The front hoop 20A with the window 36 attached may be pivoted down over the rails 16 as also the rear hoop 20B with the door 38 attached when converting the cap 10 to a cover in the general manner described in the U.S. patents referenced above and depicted in FIGS. 3 and 14.

The invention claimed is:

1. A cap for a pickup truck cargo bed comprising:
a support framework including a pair of elongated rails each adapted to be held on a top of a respective one of a cargo bed sidewalls of a pickup truck;
a front hoop member having a pair of upright legs each attached at the bottom to said framework having a top portion and intermediate corner portions connecting said top portion to said upright legs;
a rear hoop member having a pair of spaced apart upright legs each attached to said framework and having a top portion connected to an intermediate curved corner portions connecting an upper portion of each leg to said top portion;
a top assembly including a rectangular top assembly frame having a top panel fit therein, said top assembly frame extending between said front and rear hoop top portions;
a pair of rectangular bendable plastic side panels, each side panel normally having a bottom side extending below an upper edge of a respective associated riser;
said side panels each having opposite ends fit into one of a set of respective guides each held on one of said front or rear hoops and engaging a respective one of said side panel opposite ends which extend up past said upper edge of said associated riser and caused to be conformed to a curvature of each guide by engagement therewith to extend an upper portion of each side panel horizontally to be able to be extended beneath said top assembly frame;
said side panels each selectively able to be moved up and away from said associated riser to advance an upper side thereof beneath said top assembly frame and thereby forming an access opening extending between a respective associated riser and said bottom side of each of said side panels.

2. The cap according to claim 1 wherein said guides are of a length so as to allow said side panel ends to move out of engagement with said guides upon continued upward movement of said bottom side of either of said side panels.

3. The cap according to claim 2 wherein said upper side of said side panels begin to overlap each other upon continued movement of said upper sides of said side panels beneath said top assembly frame.

4. The cap according to claim 3 wherein said front and rear hoop members are each able to be folded down and said top assembly able to be disposed overlying the same to convert said cap to a cover, said side panels thereafter able to be drawn back out from beneath said top assembly to overlie said folded down hoop members and thereby block access to said cargo bed.

5. The cap according to claim 1 wherein each of said side panels comprise at least two subpanel sections one end of, one subpanel section partially overlying the other section to create an adjustable a combined length thereof and to enable being fitted to a varying length of said truck cargo bed, said subpanels able to be attached to each other in said adjusted position.

6. The cap according to claim 1 wherein said top panel is comprised of partially overlapping subpanels relatively positioned to be matched to the length of said cargo bed.

7. The cap according to claim 1 wherein said support framework further includes a pair of lengthwise extending support bars fixed at either end to said support framework spaced beneath said top assembly so that said upper portion of each side panel extends over a respective support bar and beneath said top assembly to provide support for said upper portion of said side panels.

8. The cap according to claim 1 wherein said side panels are constructed of plastic.

9. A cap for a pickup truck cargo bed attachable to a pair of side walls of said cargo bed, comprising:
   a support framework including a pair of elongated risers adapted to be attached to a top of a respective one of said pickup cargo bed sidewalls, to be held thereon;
   a front hoop member having a pair of upright legs attached to a bottom thereof to a front end of a respective riser and attached at a top portion thereof to a front hoop member top portion by an intermediate corner portion thereof;
   a rear hoop member having a pair of spaced apart upright bottom portions each upright bottom portion attached to a rear end of a respective riser and connected at a top portion thereof to a rear hoop top portion by intermediate corner portions;
   a rectangular top subassembly including a rectangular top subassembly body frame having a panel fit therein, said top subassembly frame extending between said front and rear hoop top portions;
   a front window subassembly attached to a top portion of said front hoop member and a rear door subassembly attached to said rear hoop member;
   a pair of rectangular bendable plastic side panels, each having a bottom side received in a respective riser;
   each of said side panels comprised of a plurality of overlapped subpanels fastened together to form a panel of a required length, whereby enabling a varying length of each side panels to be established.

10. A covering for a cargo bed of a pickup truck to be installed over a cargo bed of a pick up truck comprising a top frame and including elongated risers able to be mounted to the top of each of a pair of sidewalls of said cargo bed;
   an opening in said top frame which receives a plastic top panel to form a top assembly;
   two side openings each defined between a respective one of said risers and a respective side of said top frame;
   a pair of side panels each having a bottom side which normally engages a respective associated riser and an upper side which is received beneath said top frame; and
   each of said pair of side panels movable away from an associated riser towards said top frame by manually pushing said bottom side of either of said side panels towards said top assembly, said bottom side moving above said associated riser and said upper side of each of said pair of side panels advancing further beneath said top frame thereby forming a lengthwise access opening into a cargo bed as said bottom side separates from a respective one of said associated risers.

11. The covering according to claim 10 wherein said pair of side panels become overlapped with each other as said side panels are moved away from an associated riser.

* * * * *